3,390,544
ABSORPTION REFRIGERATION SYSTEMS HAVING SOLUTION-COOLED ABSORBERS
John P. Eberz, Syracuse, N.Y., assignor to Carrier Corporation, Syracuse, N.Y., a corporation of Delaware
Filed July 17, 1967, Ser. No. 653,700
7 Claims. (Cl. 62—476)

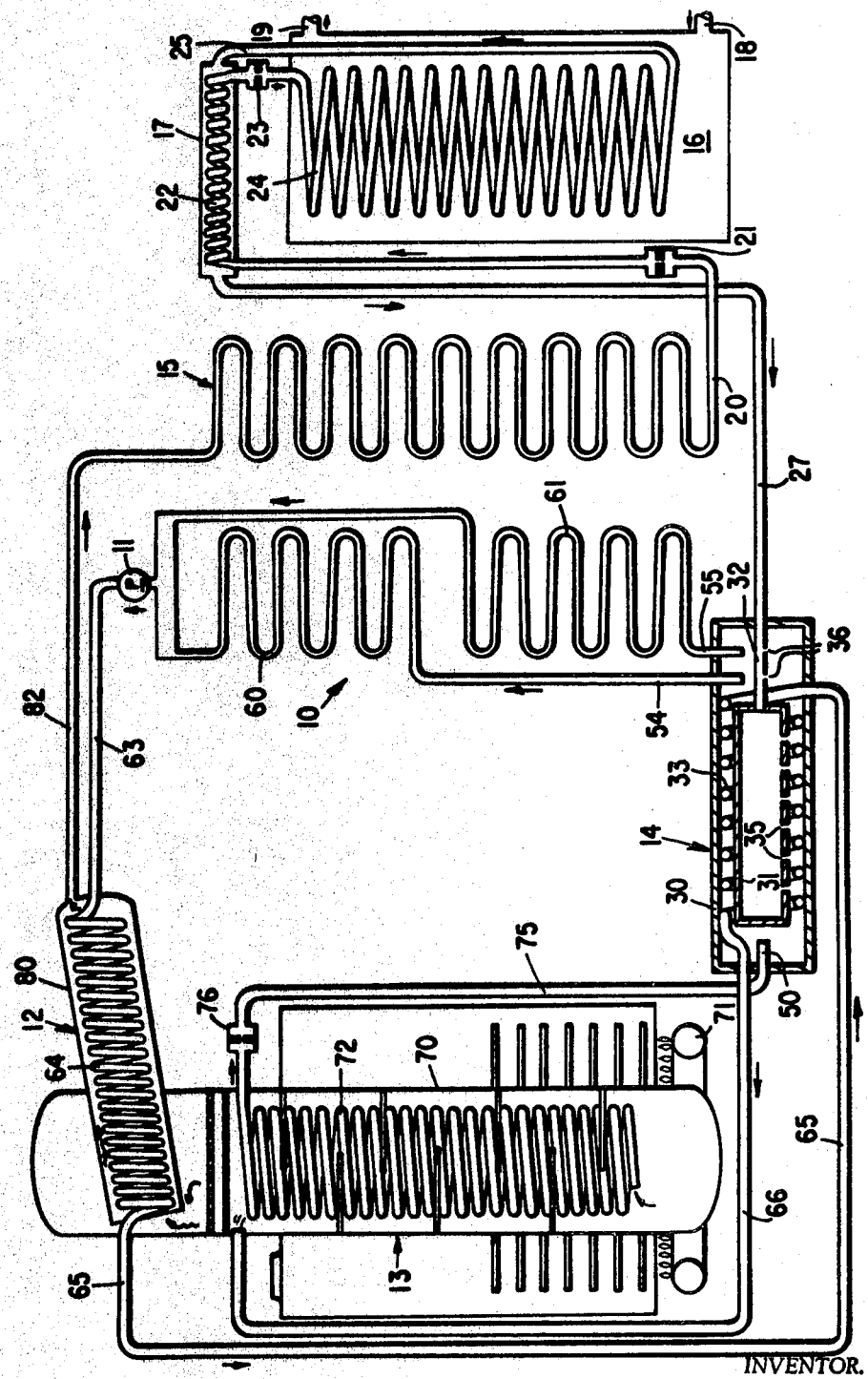

ABSTRACT OF THE DISCLOSURE

An absorption refrigeration system having a primary absorber, a solution-cooled absorber, a generator, a condenser, a rectifier, an analyzer, an evaporator, and a liquid-suction heat exchanger connected in a refrigeration circuit. The solution-cooled absorber comprises two spaced, coaxial, horizontal shells having a weak solution heat exchanger disposed between them. A first portion of the refrigerant vapor from the evaporator passes about the weak solution heat exchanger, and a second portion passes to the primary absorber without substantial contact with the weak solution heat exchanger.

Background of the invention

This invention relates to absorption refrigeration systems employing a solution-cooled absorber for simultaneously passing strong and weak absorbent solutions in heat exchange relation with each other while contacting the cooled strong solution with refrigerant vapor from the evaporator prior to passage of refrigerant vapor to the primary absorber. An absorption refrigeration system employing a solution-cooled absorber is more efficient than a system using a conventional solution heat exchanger between strong and weak solutions, because a significant quantity of heat is recovered from the condensation of refrigerant vapor into the strong absorbent solution. This heat is then transferred into the weak absorbent solution passing to the generator. Thus, even though the refrigerant vapor is cooler than either the weak or strong solution, some of its latent heat is given up by condensation or absorption of that vapor into the strong absorbent solution in the solution-cooled absorber, and this heat is transferred into the weak solution. Consequently, less heat need be supplied to the generator to boil the weak solution therein. In addition, the solution-cooled absorber also functions in the manner of a conventional heat exchanger to transfer heat between the weak and strong absorbent solutions.

However, difficulty has been experienced with prior solution-cooled absorbers in obtaining optimum heat transfer to realize the full thermodynamic potential achievable in a refrigeration system using this component. These difficulties have been due, at least in part, to inadequate wetting of the weak solution heat exchanger with strong absorbent solution, poor contact between the strong absorbent solution and the refrigerant vapor, and excessive cooling of strong solution by refrigerant vapor. These difficulties tend to reduce the total heat transferred to the weak solution passing to the generator below the theoretically obtainable maximum. Consequently, the efficiency of the system is reduced and its cost of operation is increased because additional heat energy must be added to the system in the generator.

Summary of the invention

In accordance with this invention, there is provided an absorption refrigeration system having, in addition to the usual components, a solution-cooled absorber designed to alleviate problems experienced with prior refrigeration systems described above.

In accordance with this invention, the solution-cooled absorber comprises an exterior tubular shell having an interior spaced tubular shell therein forming a solution-cooling chamber between the shells. A weak solution heat exchanger is disposed in the solution-cooling chamber between the spaced shells. Weak solution passage means is provided for passing weak absorbent solution from the primary absorber to the generator via a rectifier and the solution heat exchanger in the solution-cooled absorber. Strong solution passage means is provided for passing strong absorbent solution from the generator to the primary absorber through the solution-cooling chamber in contact with the exterior of the weak solution heat exchanger.

Refrigerant vapor passage means is provided for passing refrigerant vapor from the evaporator to the primary absorber through the absorbent solution in the solution-cooling space. A first portion of refrigerant vapor from the evaporator passes into the interior shell of the solution-cooled absorber, which is provided with a plurality of refrigerant vapor outlet ports adjacent the weak solution heat exchanger. This portion of refrigerant vapor passes about the weak solution heat exchanger to a suitable discharge passage which connects with the primary absorber. The other portion of the refrigerant vapor passes through a second set of refrigerant vapor outlet ports disposed adjacent the discharge passage means. The discharge passage means is axially spaced from the weak solution heat exchanger and the second set of refrigerant vapor outlet ports is correspondingly axially spaced from the first set thereof. Consequently, the other portion of refrigerant vapor passing through the second set of refrigerant vapor outlet ports passes into the primary absorber and bypasses the region of the weak solution heat exchanger.

Brief description of the drawing

The drawing illustrates an absorption refrigeration system having a solution-cooled absorber, shown in cross-section, embodying the principles of this invention.

Description of the preferred embodiment

Referring particularly to the drawing, there is illustrated an absorption refrigeration system of a type which employs ammonia as a refrigerant and water as an absorbent solution. While pure water is not technically a solution, it is customary to refer to the absorbent as being a solution, because it may have refrigerant dissolved therein, and the term "solution" is therefore used throughout this application to denote the absorbent.

The term "strong" solution is used herein to refer to an absorbent, which is strong in absorbing power, such as pure water. The term "weak" solution is used to denote an absorbent solution, which is weak in absorbing power, because it has a substantial quantity of refrigerant dissolved therein.

It will be appreciated that refrigerants, other than ammonia, and absorbents, other than water, may be employed within the scope of this invention, and that various modifications may be made in the system to accommodate different absorbents and refrigerants.

The absorption refrigeration system illustrated comprises a primary absorber 10, a weak solution pump 11, a rectifier 12, a generator 13, a solution-cooled absorber 14, a refrigerant condenser 15, a refrigerant evaporator 16, and liquid-suction heat exchanger 17 connected to provide refrigeration.

Liquid refrigerant condensed in condenser 15 passes through refrigerant liquid passage 20 and refrigerant restriction 21 through heat exchange coil 22 of liquid-suction heat exchanger 17. The liquid refrigerant is cooled in coil 22 and emerges from the liquid-suction heat exchanger and passes through refrigerant restriction 23 into evaporator coil 24 in refrigerant evaporator 16.

A fluid medium, such as water, to be chilled passes over the exterior of the evaporator coil 24, where it is chilled by giving up heat to evaporate refrigerant within the coil. The chilled medium passes out of the evaporator 16 through line 19 to suitable remote heat exchangers (not shown), after which it is returned to the evaporator through line 18 for rechilling.

The cold refrigerant evaporated in evaporator coil 24 passes through refrigerant vapor passage 25 and through liquid-suction heat exchanger 17 in heat exchange relation with liquid refrigerant passing through coil 22. The refrigerant vapor then passes through refrigerant vapor passage 27 into solution-cooled absorber 14.

The solution-cooled absorber, in accordance with this invention, comprises an exterior tubular, preferably cylindrical, shell 30, having its axis disposed in a substantially horizontal plane. A tubular, preferably cylindrical, interior shell 31 is disposed with exterior shell 30 in spaced relation therewith. Preferably, interior shell 31 is coaxial with exterior shell 30 so as to form an annular solution-cooling chamber in the space between the shells. Interior shell 31 has an extended portion 32 which may comprise a reduced diameter portion of similar diameter to weak solution passage 27.

Weak solution heat exchanger 33, preferably comprising a helical coil, is coaxially disposed in the annular solution-cooling chamber formed by exterior and interior spaced shells 30 and 31.

A plurality of first refrigerant vapor outlet ports 35 are provided in the lower portion of shell 31 adjacent weak solution heat exchanger 33 for distribution of one portion of the refrigerant vapor passed from passage 27 into interior shell 31 in the region about weak solution heat exchanger 33.

A plurality of discharge passages 54 and 55 extend from exterior shell 30 adjacent extended portion 32 of inner shell 31. Discharge passages 54 and 55 comprise vapor-liquid passages, and are located in a region horizontally axially spaced from the region of weak solution heat exchanger 33.

A second set of refrigerant vapor outlet ports 36 are formed in the lower portion of the extension 32 of the interior shell 31. The second set of refrigerant vapor outlet ports are disposed adjacent discharge passages 54 and 55 and are axially spaced from the region of first refrigerant vapor outlet ports 35. The other portion of the refrigerant vapor passing to the solution-cooled absorber through passage 27 is discharged into absorbent solution between inner and outer shells 30 and 31 through second outlet ports 32 adjacent discharge passages 54 and 55, thus bypassing the region of weak solution heat exchanger 33.

A strong solution inlet passage 50 is provided to admit strong absorbent solution into the solution-cooling chamber in solution-cooled absorber 14 to maintain it flooded with absorbent solution so that refrigerant vapor outlet ports 35 and 36 are submerged in solution at all times during operation. Inlet 50 is provided adjacent the end of the solution-cooling chamber at which weak solution exits, through passage 66, so as to provide a counterflow effect therebetween.

Primary absorber 10 comprises a plurality of absorber circuits 60 and 61, only two of which are shown for clarity of illustration. In practice, any number of absorbent circuits may be employed, and a number of absorbent circuits may terminate in an additional absorbent circuit connected in series therewith.

A like number of strong solution discharge passages 54, 55 pass a mixture of unabsorbed refrigerant vapor and strong solution out of the solution-cooling chamber of solution-cooled absorber 14 to the circuits of primary absorber 10.

A cooling medium, preferably ambient air, is passed over the absorber to cool the absorbent solution therein to promote the absorption of additional refrigerant vapor therein. The same cooling air may also pass over condenser 15 to condense refrigerant therein.

Cold weak absorbent solution passes from absorber 10 and is pumped by weak solution pump 11 through solution passage 63 and rectifier heat exchange coil 64. The weak solution then passes through weak solution passage 65 to weak solution heat exchanger 33 in solution-cooled absorber 14. The warmed weak solution passes from weak solution heat exchanger 33 through weak solution passage 66 and is discharged into the upper analyzer section of generator 13.

Generator 13 comprises a finned shell 70 heated by a gas burner or other suitable source 71 and is provided with an analyzer heat exchange coil 72 in the upper portion thereof. The weak solution is boiled in generator 13 to concentrate the weak solution, thereby forming a strong solution, and to generate refrigerant vapor, thereby separating the vapor from the absorbent solution.

The hot strong absorbent solution passes upwardly through the analyzer section of generator 13 through analyzer coil 72 in heat exchange with weak solution passing downwardly over the analyzer coil. The warm strong solution then passes through strong solution passage 75 and is discharged into solution-cooled absorber 14 through inlet passage 50.

Refrigerant vapor formed in generator 13 passes upwardly through the analyzer section thereof where it is concentrated by mass transfer with weak solution passing downwardly over analyzer coil 72. The vapor passes into the shell 80 of rectifier 12, where it is further concentrated by heat exchange with the cold weak solution passing through rectifier coil 64. The concentrated refrigerant vapor passes from rectifier 12 through refrigerant vapor passage 82 into condenser 15, where it is cooled and condensed by heat exchange with ambient air or other fluid medium passing over the condenser.

In operation, solution-cooled absorber 14 serves to pass cool weak solution from absorber 10 via rectifier coil 64 in heat exchange relation with warm strong solution from generator 13 via analyzer coil 72, while simultaneously cold refrigerant vapor from evaporator 16 via liquid-suction heat exchanger 17 is passed in heat and mass transfer relation with the strong solution in the solution-cooling chamber of the solution-cooled absorber. The absorbent solution in solution-cooled absorber 14 and second solution chamber 29 may be referred to as strong solution, although it will be appreciated that it is actually at an intermediate concentration between that passing from generator 13 and that passing from primary absorber 10, because some refrigerant vapor has been absorbed therein.

It will be understood that even though the refrigerant vapor is colder than the weak solution in the solution-cooled absorber, it contains a substantial amount of heat of vaporization, which is released into the solution upon condensation or absorption into the strong solution. Since the efficiency of the cycle is determined, to a large extent, by the amount of heat which can be transferred from the weak to the strong solution, the use of a solution-cooled absorber wherein the heat of vaporization of the refrigerant vapor is partially recovered to preheat the weak solution before passage to the generator materially improves the efficiency of the cycle by reducing the heat input required to the generator. Refrigerant vapor is distributed between the region of the solution-cooled absorber adjacent weak solution heat exchanger 30 and the region thereof adjacent discharge passages 54, 55 by ports 35 and 36 in a ratio to prevent excessive cooling of the strong solution by unabsorbed cold vapor, which would reduce the total heat transferred by decreasing the temperature difference with the weak solution.

The solution-cooled absorber of this invention may be conveniently located at the bottom of an absorption refrigeration machine, so as to maintain it flooded with a frothy mixture of absorbent solution and refrigerant vapor at all times, thus assuring good mixing and contact between the refrigerant vapor and the absorbent solution therein.

The helical weak solution heat exchanger provides a corkscrew effect which assists in passing absorbent solution and refrigerant vapor toward discharge passages 54, 55. Further, vapor ports 35 may pass slightly more vapor than is absorbed into the absorbent solution to help provide solution movement which results in a counterflow effect between refrigerant vapor and weak solution in heat exchanger 33 to increase the temperature difference therebetween.

It will be seen that in accordance with this invention, there is provided an inexpensively constructed solution-cooled absorber which achieves the advantages of this invention by proper distribution and mixing of refrigerant vapor with strong solution in the solution-cooling chamber, while bypassing other refrigerant vapor directly to the primary absorber. Since the solution-cooled absorber may be made of tubular shell-like construction, it is easily manufactured by employing standard tube forming equipment.

While a preferred embodiment of this invention has been illustrated and described, it will be appreciated that the invention may otherwise be embodied within the scope of the following claims.

I claim:
1. An absorption refrigeration system comprising:
 (A) an evaporator for evaporating refrigerant to produce cooling,
 (B) a primary absorber for absorbing evaporated refrigerant into an absorbent solution to form weak solution,
 (C) a generator for boiling weak solution to concentrate the weak solution and to form refrigerant vapor,
 (D) a condenser for condensing refrigerant vapor formed in said generator;
wherein the improvement comprises,
 (E) a solution-cooled absorber for transferring heat between strong solution passing from said generator to said primary absorber, weak solution passing from said primary absorber to said generator and refrigerant vapor passing from said evaporator to said primary absorber, said solution-cooled absorber including:
  (1) a tubular exterior shell adapted to contain absorbent solution and refrigerant vapor,
  (2) a tubular interior shell adapted to contain refrigerant vapor disposed within said exterior shell in spaced relation therewith, thereby forming a solution-cooling chamber between said shells, and a refrigerant vapor chamber within said interior shell,
  (3) a weak solution heat exchanger disposed in the solution-cooling chamber between the interior and the exterior shells for pasing cool weak absorbent solution in heat exchange relation with warm strong solution in said solution space,
  (4) weak solution passage means for passing cool weak absorbent solution from said primary absorber through said weak solution heat exchanger to said generator,
  (5) discharge passage means extending from said exterior shell, said discharge passage means comprising a vapor liquid passage for passing a mixture of refrigerant vapor and absorbent solution from said solution-cooled absorber to said primary absorber,
  (6) strong solution passage means for passing warm strong absorbent solution from said generator through the solution space in said solution-cooled absorber and through said discharge passage means to said primary absorber, said warm strong solution being in heat exchange relation with cool weak solution in said solution-cooled absorber,
  (7) refrigerant vapor passage means for passing refrigerant vapor from said refrigerant evaporator into the refrigerant vapor chamber within the inner shell of said solution-cooled absorber, and
  (8) means defining a first refrigerant vapor outlet port in said interior shell, said first port being disposed below the level of absorbent solution in said solution-cooled absorber and adjacent said weak solution heat exchanger for passing refrigerant vapor through absorbent solution in said solution-cooling chamber about said weak solution heat exchanger.

2. An absorption refrigeration system as defined in claim 1 wherein the axes of said tubular shells are disposed in a substantially horizontal plane.

3. An absorption refrigeration system as defined in claim 1 wherein
 (A) said tubular interior shell is coaxial with said outer shell to define an annular solution-cooling chamber therebetween; and
 (B) said weak solution heat exchanger comprises a helical coil disposed between said shells in said annular solution-cooling chamber.

4. An absorption refrigeration system as defined in claim 1 wherein
 (A) said tubular interior shell is horizontally coaxial with said outer shell to define an annular substantially horizontal solution-cooling chamber therebetween;
 (B) said weak solution heat exchanger comprises a helical coil disposed between said shells in said annular solution-cooling chamber; and
 (C) said first refrigerant vapor outlet port is disposed to discharge refrigerant vapor in a substantially downward direction so that the refrigerant vapor passes upwardly through the solution about said weak solution heat exchanger.

5. An absorption refrigeration system as defined in claim 4 including a plurality of axially spaced first refrigerant vapor outlet ports disposed in the region of said weak solution heat exchanger.

6. An adsorption refrigeration system as defined in claim 1, wherein said discharge passage means is spaced along the axis of said exterior shell from said weak solution heat exchanger and including means defining a second refrigerant vapor outlet port in said interior shell axially spaced from said first port, said second port being disposed adjacent said discharge passage means, for passing refrigerant vapor to said primary absorber through said discharge passage means.

7. An absorption refrigeration system as defined in claim 6 wherein
 (A) said tubular interior shell is coaxial with said outer shell to define an annular solution-cooling chamber therebetween;
 (B) said weak solution heat exchanger comprises a helical coil coaxially disposed between said shells in said annular solution-cooling chamber;
 (C) the axes of said tubular shells and said weak solution heat exchanger are disposed in a substantially horizontal plane;

(D) said first refrigerant vapor outlet port is disposed to discharge refrigerant vapor in a substantially downward direction so that refrigerant vapor passes upwardly through the solution about said weak solution heat exchanger;

(E) said discharge passage means is disposed adjacent one end of said annular chamber; and (F) said second refrigerant vapor port is disposed to discharge refrigerant vapor through absorbent solution in said solution-cooling chamber adjacent said discharge passage means and said one end of said annular chamber.

References Cited

UNITED STATES PATENTS

| | | | |
|---|---|---|---|
| 2,283,213 | 5/1942 | Katzow | 62—484 X |
| 2,550,428 | 4/1951 | Reid | 62—494 X |
| 3,210,057 | 10/1965 | Deady et al. | 62—494 X |
| 3,273,350 | 9/1966 | Taylor | 62—101 |
| 3,353,369 | 11/1967 | Whitlow | 62—494 |

LLOYD L. KING, *Primary Examiner.*